United States Patent
Morrell et al.

(10) Patent No.: US 8,265,285 B2
(45) Date of Patent: Sep. 11, 2012

(54) SYSTEM FOR MONITORING AUDIBLE TONES IN A MULTIPLE PLANAR CHASSIS

(75) Inventors: Carl A. Morrell, Cary, NC (US); William B. Schwartz, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

(21) Appl. No.: 12/125,782

(22) Filed: May 22, 2008

(65) Prior Publication Data
US 2008/0219461 A1   Sep. 11, 2008

Related U.S. Application Data

(63) Continuation of application No. 10/762,009, filed on Jan. 21, 2004, now Pat. No. 7,395,459.

(51) Int. Cl.
*H04R 29/00* (2006.01)
(52) U.S. Cl. ........... 381/58; 381/59; 700/94; 714/36; 714/39; 714/57
(58) Field of Classification Search ............ 381/58–59, 381/77, 82; 714/48, 36, 39, 40–45, 57; 700/94
See application file for complete search history.

(56) References Cited

U.S. PATENT DOCUMENTS

| | | | |
|---|---|---|---|
| 5,345,510 A * | 9/1994 | Singhi et al. | 381/77 |
| 6,263,304 B1 | 7/2001 | Fischer et al. | |
| 6,393,586 B1 | 5/2002 | Sloan et al. | |
| 6,625,742 B1 | 9/2003 | Owhadi et al. | |
| 6,832,344 B2 | 12/2004 | Lin et al. | |
| 2002/0032885 A1 | 3/2002 | Dai | |
| 2002/0062727 A1 * | 5/2002 | Poisner | 84/604 |
| 2002/0159608 A1 * | 10/2002 | Fado et al. | 381/104 |
| 2005/0097310 A1 * | 5/2005 | Chu et al. | 713/2 |
| 2008/0219461 A1 * | 9/2008 | Morrell et al. | 381/58 |

* cited by examiner

*Primary Examiner* — Disler Paul
(74) *Attorney, Agent, or Firm* — Brandon C. Kennedy; Cynthia G. Seal; Biggers & Ohanion, LLP

(57) ABSTRACT

Aspects for monitoring audible tones indicative of operational status of each planar in a multiple planar chassis are described. Included in the aspects is the monitoring of a speaker channel of each planar of a plurality of planars in a common chassis for state changes of beep tones. An operational status of a specific planar emitting the beep tones is identified based on the state changes.

7 Claims, 3 Drawing Sheets

SYSTEM FOR MONITORING AUDIBLE TONES IN A MULTIPLE PLANAR CHASSIS

CROSS-REFERENCE TO RELATED APPLICATIONS

Under 35 USC §120, this application is a continuation application and claims the benefit of priority to U.S. patent application Ser. No. 10/762,009, filed Jan. 21, 2004, entitled "Method for Monitoring Audible Tones in a Multiple Planar Chassis", all of which is incorporated herein by reference.

FIELD OF THE INVENTION

The present invention relates to monitoring audible tones indicative of operational status of each planar in a multiple planar chassis.

BACKGROUND OF THE INVENTION

Audible alerts are a common mechanism for personal computers to relay their operating status to the end user. These alerts are typically known as "beep codes" and are commonly used when the system has failed to boot during power on self test (POST)/BIOS execution, and the system was unable to display a visible warning to the local monitor. For example, a system with no memory installed will fail with a NOMEM error, which is assigned to a 3-3-3 beep code (i.e., 3 rapid beeps, pause 3 rapid beeps, pause, 3 rapid beeps).

While these beep codes provide an indication of operating status, a problem exists on blade-type systems, such as BladeCenter from IBM Corporation, where multiple, independent planar or server systems reside in a common mechanical housing. If a planar in such a housing were to fail to boot during POST, for example, the standard audible tone alerting the user to the failure either would not be heard or could not be resolved to the one failing planar out of those installed.

Accordingly, a need exists for a mechanism to propagate the audible alert in a manner that allows monitoring and management of all of the planars within the housing. The present invention addresses such a need.

SUMMARY OF THE INVENTION

Aspects for monitoring audible tones indicative of operational status of each planar in a multiple planar chassis are described. Included in the aspects is the monitoring of a speaker channel of each planar of a plurality of planars in a common chassis for state changes of beep tones. An operational status of a specific planar emitting the beep tones is identified based on the state changes.

Through the present invention, propagation of an audible alert on an individual planar occurs in a manner that allows monitoring and management of an entire chassis of planars. These and other advantages will become readily apparent from the following detailed description and accompanying drawings.

DETAILED DESCRIPTION

The present invention relates to monitoring audible tones indicative of operational status of each planar in a multiple planar chassis. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
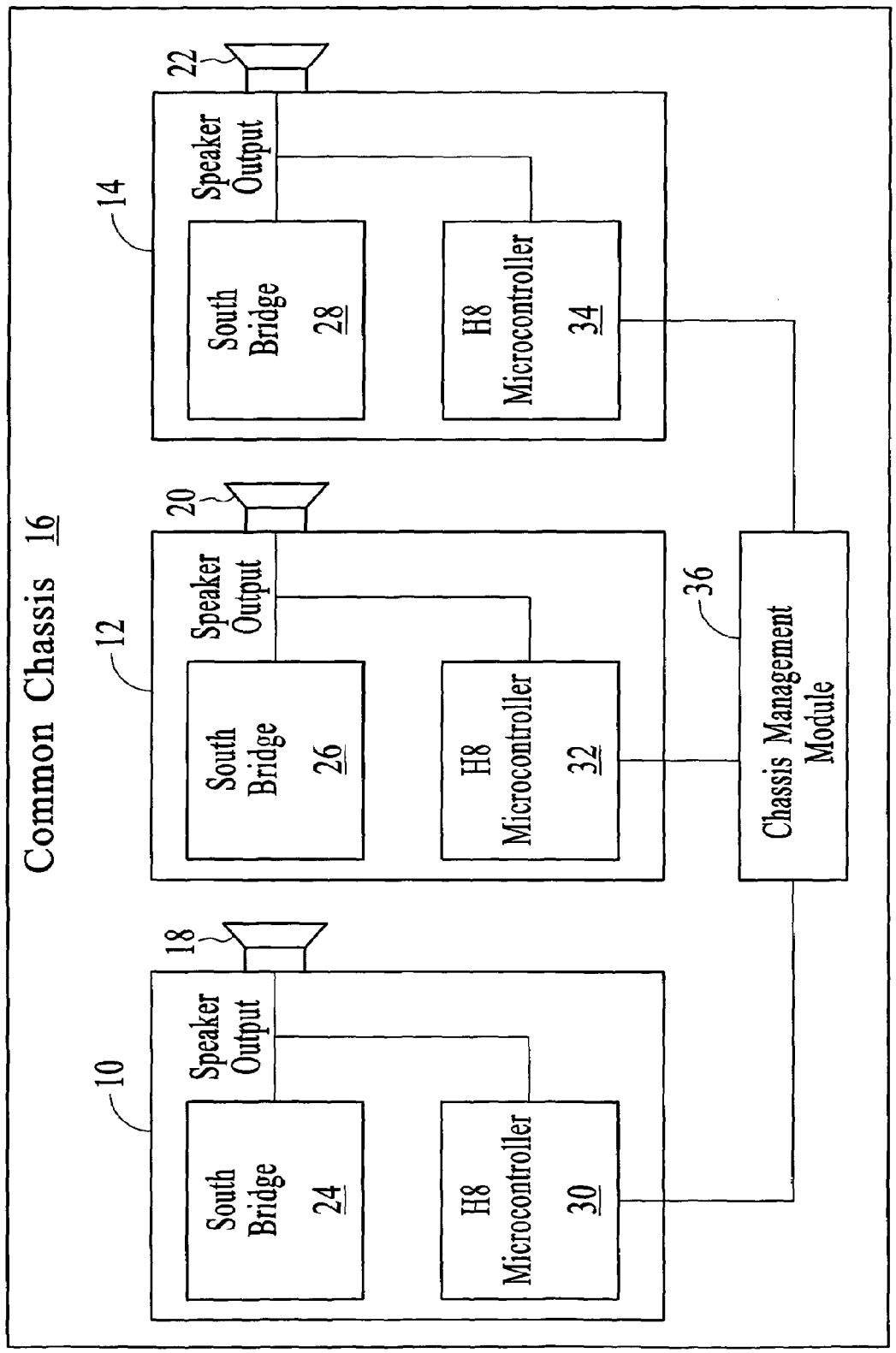
FIG. 1 illustrates a diagram of an example of a blade-type chassis environment.

FIG. 1 illustrates a diagram of an example of a blade-type environment where three independent system planars 10, 12, and 14 reside in a common mechanical housing/chassis 16. With current technology, the standard speaker output signals are wired directly to speakers 18, 20, and 22 on the planars 10, 12, and 14. The speaker output signals are typically located on the planar south bridge chipset 24, 26, or 28 (e.g., Serverworks CSB5) and derived from a programmable timer (e.g., legacy 8253) of the chipset. Also included on the planars 10, 12, and 14 are management microcontrollers 30, 32, and 34 (e.g., Renesas (formerly Hitachi) H8S-2148) which includes firmware to monitor planar voltages from analog inputs as voltage sources, such as for various conditions (temperature, fans, etc.) on the planars, and forward the appropriate warnings to the central chassis management module 36.

Figure 2:
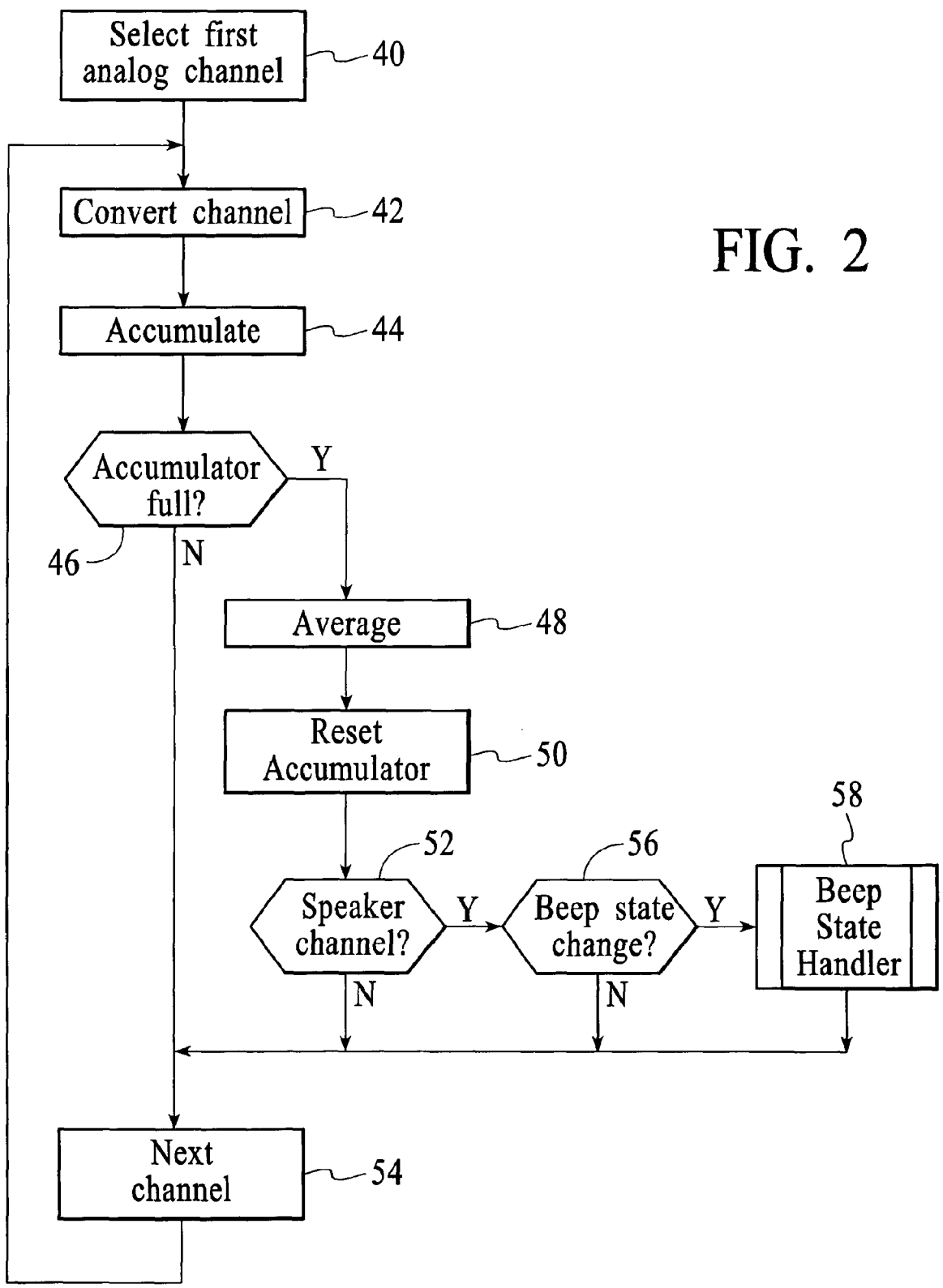
FIG. 2 illustrates a block flow diagram of an analog-to-digital converter handler routine that includes the monitoring of the present invention.

The present invention extends the activity of the analog-to-digital converter firmware of the microcontrollers 30, 32, and 34 to detect on-to-off and off-to-on transitions of the speaker data input. FIG. 2 illustrates a block flow diagram of an analog-to-digital converter handler routine that includes the enhancements of the present invention. As is standardly done, a first analog channel is selected (step 40), the analog channel data is converted to digital (step 42), and the data is accumulated (step 44). When the accumulator is full (as determined via step 46), the data is averaged (step 48), and the accumulator is reset (step 50). The enhancement to the handler routine in accordance with the present invention commences with detection of whether the data is from a speaker channel (step 52). If not, the process repeats after selection of a next channel (step 54).

When the data is from a speaker channel, a check of the data is made to determine whether it is beep state change data (via step 56), and if not, the process continues with a next channel (step 54). When it is beep state change data, such as may occur during a POST routine, a beep state handler routine proceeds (step 58), as described in more detail with reference to the block flow diagram of FIG. 3.

Figure 3:
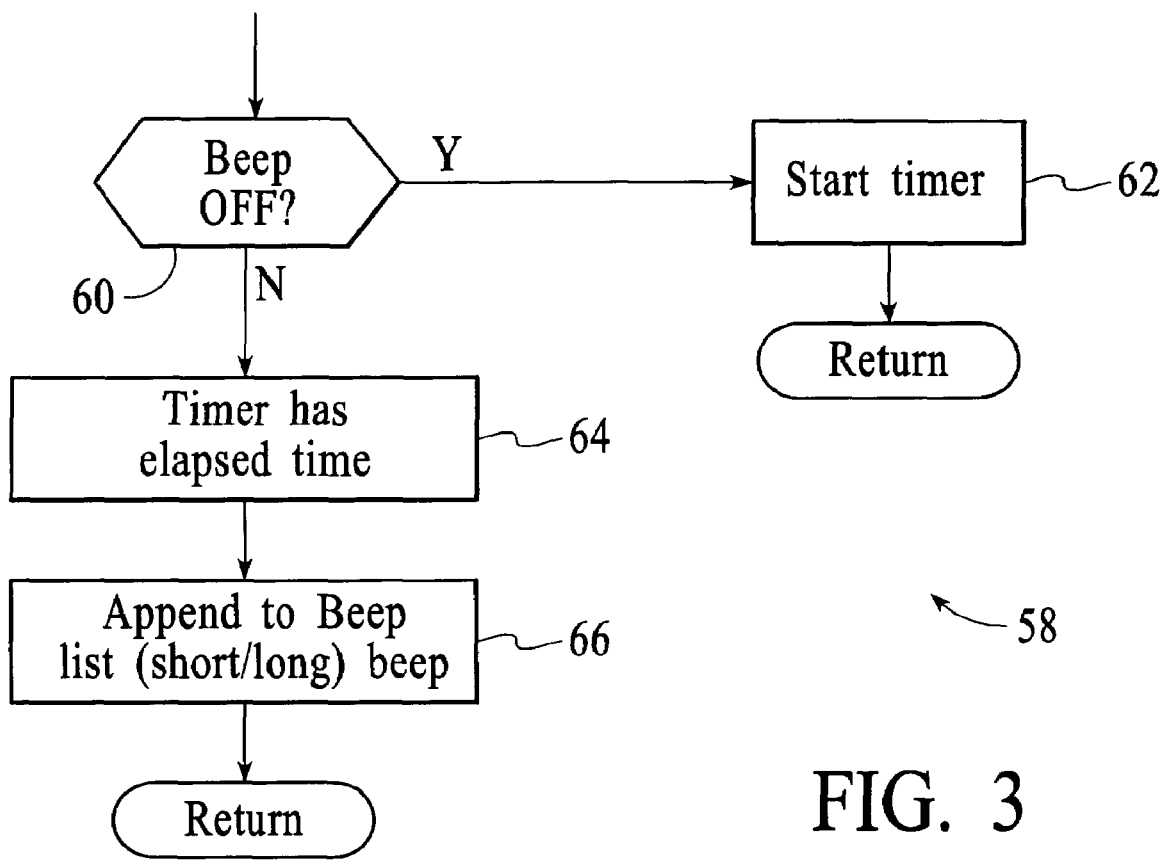
FIGS. 3 and 4 illustrate block flow diagrams of aspects of a beep state handler in accordance with the present invention.

The beep handler routine processes the on/off and off/on transitions and records the transitions with the assistance of a timer. Each off/on transition can be used to determine the duration of the beep to identify the type of beep (i.e., short or long). Thus, as shown in FIG. 3, the beep handler determines if the beep is in an OFF state (step 60), and if so, a timer is started (step 62). The process then returns to await data indicative of a next beep state change. Once the beep state change data is not in a beep OFF state (step 60 is negative), an off-to-on transition has occurred, and the process continues to indicate the elapsed time of the timer (step 64). An indication of the type of beep, short or long, based on the amount of elapsed time is appended to a beep list (step 66) and the process returns to await data indicative of a next beep state change.

Figure 4:
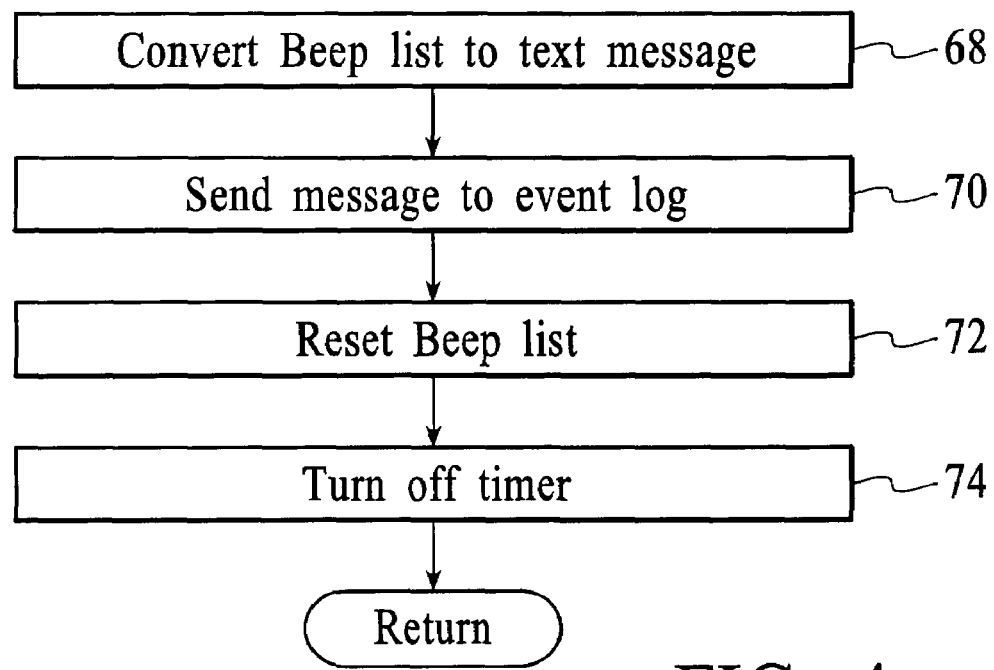

Referring now to the block flow diagram of FIG. 4, once all of the beep list data has been collected, the beep list data is converted to a text message (step 68) and is sent to an event log of the chassis management module (step 70). The beep list is then reset (step 72) and the timer is turned off (step 74).

With the collection and reporting of the beep data by the present invention, better identification of a problem of an individual planar within the chassis is achieved. Further, this identification allows for better monitoring of different entities, such as POST, diagnostic and manufacturing utilities, that utilize the planar speaker to signal the operating status. In addition, the present invention provides the ability to propagate the operational status to the central management module even in those situations, such as I2C failure, where other mechanisms are unable provide such information.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A system for monitoring audible tones indicative of operational status of each planar in a multiple planar chassis, the system comprising:
   a chassis;
   a plurality of planars contained within the chassis, each of the plurality of planars including a speaker output that emits beep tones and each planar monitoring the beep tones for state changes, wherein each planar includes a management controller for monitoring the speaker output, wherein an operational status of each planar based on the state changes is identified; and
   a chassis management module within the chassis and coupled to each planar; and
   wherein the management microcontroller provides the state changes as a text message to an event log of the chassis management module.

2. The system of claim 1 wherein the management microcontroller utilizes a timer to detect a duration of the beep tones.

3. The system of claim 1 wherein the state changes further comprise off-to-on and on-to-off transitions of the beep tones.

4. The system of claim 1 wherein the beep tones further comprise beep tones during a POST routine.

5. A multiple planar chassis, the chassis comprising:
   a plurality of planars, each of the plurality of planars including a speaker and a management microcontroller, the management microcontroller monitoring signals output to the speaker to detect potential fault conditions in the planar; and
   a chassis management module coupled to each management microcontroller and receiving data from the management microcontroller indicative of a detected fault condition, the management microcontroller monitors state transitions in audible beep tones.

6. The chassis of claim 5 wherein the management microcontroller monitors the audible beep tones during a planar POST routine.

7. The chassis of claim 5 wherein the management microcontroller sends a text message to an event log of the chassis management module based on the state transitions.

\* \* \* \* \*